(12) United States Patent
Häckel

(10) Patent No.: US 11,351,974 B2
(45) Date of Patent: Jun. 7, 2022

(54) TUBE FASTENING UNIT AND METHOD FOR FASTENING A TUBE TO A FASTENING CLIP

(71) Applicant: TI Automotive (Fuldabrück) GmbH, Fuldabrück (DE)

(72) Inventor: Andre Häckel, Waldeck (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 0 days.

(21) Appl. No.: 17/058,000

(22) PCT Filed: May 29, 2019

(86) PCT No.: PCT/IB2019/054450
§ 371 (c)(1),
(2) Date: Nov. 23, 2020

(87) PCT Pub. No.: WO2019/229672
PCT Pub. Date: Dec. 5, 2019

(65) Prior Publication Data
US 2021/0197786 A1    Jul. 1, 2021

(30) Foreign Application Priority Data
May 29, 2018  (EP) ..................................... 18174920

(51) Int. Cl.
*B60T 17/04* (2006.01)
*F16L 3/13* (2006.01)

(52) U.S. Cl.
CPC .............. *B60T 17/046* (2013.01); *F16L 3/13* (2013.01)

(58) Field of Classification Search
CPC ... B60T 17/046; F16L 3/13; F16L 3/02; F16L 3/04; F16L 3/08; F16L 3/12; F16L 3/1207; F16L 3/1211; F16L 3/1215
See application file for complete search history.

(56) References Cited

U.S. PATENT DOCUMENTS

| 4,865,361 A | 9/1989 | Koukal et al. |
| 2003/0184073 A1* | 10/2003 | Kacines ................. B60T 8/329 280/781 |

FOREIGN PATENT DOCUMENTS

| DE | 3721501 C1 | 9/1988 |
| WO | WO-2008046611 A1 * | 4/2008 ....... B29C 66/91423 |

OTHER PUBLICATIONS

Craftech 2017 web article "an introduction to the ultrasonic welding of plastics" weblink: https://www.craftechind.com/an-introduction-to-the-ultrasonic-welding-of-plastics/ (Year: 2017).*
LPKF 2011 online article titled "Plastic Joining: Process Comparison" weblink: https://www.laserplasticwelding.com/process_comparison_laser_plastic_welding_versus_the_competition.pdf (Year: 2011).*

* cited by examiner

*Primary Examiner* — Terrell L McKinnon
*Assistant Examiner* — Ding Y Tan
(74) *Attorney, Agent, or Firm* — Dickinson Wright PLLC

(57) ABSTRACT

Tube fastening unit of at least one fastening clip and at least one motor vehicle tube fastened to the fastening clip. The motor vehicle tube has an outer surface made of plastic, which is welded with the fastening clip. The fastening clip has at least one welding element, which at least partially consists of a weldable plastic which is welded with the outer surface of the tube. The welding element is positively and/or non-positively fastened to the fastening clip.

18 Claims, 1 Drawing Sheet

TUBE FASTENING UNIT AND METHOD FOR FASTENING A TUBE TO A FASTENING CLIP

RELATED APPLICATIONS

The present patent document claims priority to PCT Application PCT/IB2019/054450, filed May 29, 2019, which claims benefit of European Application 18174920.1, filed May 29, 2018, the entire contents of which are incorporated herein by reference.

FIELD

The present disclosure relates to a tube fastening unit comprising at least one fastening clip and at least one motor vehicle tube which can be fastened or is fastened to the fastening clip. The disclosure further relates to a method for fastening a motor vehicle tube to a fastening clip.

BACKGROUND

The above-mentioned fastening clips are used for fastening a motor vehicle tube in motor vehicles. It is within the scope of the disclosure that such a motor vehicle tube is fastened with a plurality of fastening clips over its length or is fastened in/to a motor vehicle. This is to avoid unwanted axial movements and rotational movements of the motor vehicle tube. The motor vehicle tube is in particular a fuel line, a tube for brake fluids or a tube for a fluid temperature control medium. Other applications of the motor vehicle tube according to the disclosure are possible. The motor vehicle tube is, in particular, a multi-layer tube in which a plurality of plastic layers are arranged one above the other.

Tube fastening units of the type described above are known in practice in different embodiments. Basically, it is first known to fasten such tubes only mechanically. However, we have found that such a mechanical fastening is usually not sufficient if the motor vehicle tubes consist of plastic material or polymer material. Especially in the case of warmed up or heated tubes problems arise due to the flow properties of the polymer material.

It is already known to weld motor vehicle tubes made of plastic material with fastener elements. Here, however, it is necessary to select the fastening element or the material of the fastening element so that it is compatible with the plastic material of the motor vehicle tube or that it is weldable with the latter. In motor vehicle tubes made of different plastics or with outer layers of different plastics, a plurality of fastening elements is thus required in order to be able to securely fasten the individual motor vehicle tubes by welding them to the fastening element. This is very complicated and expensive, especially with regard to the production and storage of the plurality of fastener elements.

Incidentally, laser welding of plastic components has become more and more important in recent years. When a plastic motor vehicle tube is to be welded to a plastic fastener element or plastic fastener clip, we have found that it may be necessary that the entire fastener element or the entire fastener clip consists of optically transparent material with respect to the laser wavelength in order to ensure functionally reliable laser welding. That is relatively expensive.

SUMMARY

In contrast, the present disclosure is based on the technical problem of providing a tube fastening unit of the type mentioned, in which the above-mentioned disadvantages can be avoided and which above all allows a simple, uncomplicated and inexpensive fastening of a motor vehicle tube to a fastening clip. The disclosure is further based on the technical problem of specifying a corresponding method for fastening a motor vehicle tube to a fastening clip.

To solve this technical problem, the disclosure teaches a tube fastening unit comprising at least one fastening clip and at least one motor vehicle tube which can be fastened or is fastened to the fastening clip, wherein the motor vehicle tube has an outer surface made of plastic which is weldable or can be welded to the fastening clip, wherein the fastening clip has at least one welding element, which consists at least partially of a weldable plastic, which is weldable with or welded to the outer surface of the tube and wherein the welding element can be or is positively and/or non-positively and/or materially—preferably positively and/or non-positively—fastened to the fastening clip.

It is within the scope of the disclosure that a motor vehicle tube and a plurality of fastening clips form the tube fastening unit according to the disclosure. Expediently, a motor vehicle tube is fastened to a motor vehicle with a plurality of such fastening clips, wherein the fastening clips are distributed over the length of the tube and are preferably arranged at constant or substantially constant distances from one another.

It is also within the scope of the disclosure that the at least one fastening clip consists of plastic or substantially of plastic. In this case, the fastening clip has at least one—preferably a—welding element, which consists at least partially of a plastic which is weldable with the outer surface of the tube. According to a recommended embodiment, a welding element completely or substantially completely consists of a plastic which is weldable with the outer surface of the tube.

It is within the scope of the disclosure that the fastening clip incidentally or otherwise consists of a material which is different from the material of which the weldable plastic of the welding element consists or at least substantially consists. Expediently, the fastening clip consists of at least 90 wt.-%, preferably at least 95 wt.-% and preferably at least 98 wt.-% of a material which is different from the material of which the weldable plastic of the welding element consists and it is indeed recommended that the fastening clip consists of a plastic which is different from one of the weldable plastics of the welding element. It is recommended that the entire fastening clip (including welding element) should be made of plastic or substantially consist of plastic, wherein it is expedient that the nature or the properties of the plastic of the welding element on the one hand and of the rest of the fastening clip on the other hand are different.

According to a particularly recommended embodiment of the disclosure, the welding element is positively and/or non-positively fastened and not materially fastened to the fastening clip. Expediently, the welding element is only positively fastened and/or only non-positively fastened to the fastening clip. In contrast, the welding element is welded to the motor vehicle tube which is received in the associated fastening clip and thus materially connected.

A recommended embodiment of the disclosure is characterized in that the welding element can be fastened or is fastened to the fastening clip with the proviso that the weldable plastic of the welding element is at least partially arranged at at least one side of the fastening clip or the welding element without cover or without the interposition of other components. Expediently, the mentioned side of the fastening clip or of the welding element is the side of the fastening clip or of the welding element facing the tube to be fastened. The fact that the welding element is arranged at the said side without cover and without the interposition of other components means within the scope of the disclosure, in particular, that the welding element or the weldable plastic of the welding element can be brought directly into contact with the outer surface of the tube, so that a welding of the welding element or the weldable region of the welding element with the outer surface of the tube is possible.

It is therefore within the scope of the disclosure that the weldable plastic of the welding element is provided at the first side of the fastening clip or the welding element facing the tube at least in regions without cover or without the interposition of further components or layers. Thereby, the weldable plastic can be brought directly into contact with the outer surface of the tube and easily welded to the outer surface of the tube. According to a preferred embodiment variant, the cover-free region of the welding element facing the tube consists completely or substantially completely of the weldable plastic. A highly recommended embodiment of the disclosure is characterized in that the entire welding element consists of the weldable plastic or substantially of the weldable plastic.

An exemplary embodiment of the disclosure is characterized in that at least a portion of the welding element or the weldable plastic of the welding element is at least partially arranged without cover or without the interposition of other components at the first side (inside) of the fastening clip facing the tube or the welding element as well as at the second side (outside) of the fastening clip or the welding element facing the first side. This embodiment is particularly suitable for welding the welding element to the outer surface of the tube. On the one hand, the welding element or the weldable plastic of the welding element can be brought into direct contact with the outer surface of the tube and, on the other hand, the welding element or the weldable plastic of the welding element is readily accessible from the outside of the fastening clip for welding.

It is within the scope of the disclosure that the welding element consists or substantially consists of a first weldable plastic at the first side facing the tube or consists or substantially consists of at least one plastic or a second plastic at the side facing away from the tube. An embodiment of the disclosure is characterized in that the welding element—in particular in the radial direction with respect to the tube—is formed multi-layered, in particular that it has two layers. A particularly preferred embodiment variant is characterized in that a layer facing the tube or a layer of the welding element which can be brought into contact directly with the tube consists of the weldable plastic or substantially consists thereof. Thus, in particular for laser welding of the tube to the fastening clip, a layer of the welding element facing the tube or directly bringable into contact with the tube can consist or substantially consists of the weldable plastic and at least one further layer of the welding element can consist or substantially consists of a laser-transparent material.

According to a recommended embodiment of the disclosure, the welding element is positively received and, according to a variant embodiment, only positively received or fastened in a clip receptacle of the fastening clip. This embodiment is characterized in that the welding element can be inserted in a simple manner into the clip receptacle of the fastening clip and, according to a variant embodiment, can also be removed or exchanged. A proven embodiment of the disclosure is characterized in that the welding element is both positively and non-positively received or fastened in a clip receptacle of the fastening clip. For example, the welding element can be fastened in the clip receptacle of the fastening clip by means of a clamping connection or the like. It is also within the scope of the disclosure that the welding element can be fastened or is fastened to the fastening clip by means of a latching connection, in particular in a clip receptacle of the fastening clip.

According to one embodiment, the welding element is plate-shaped or platelet-shaped and in particular has the shape of a flat plate or a flat platelet. But it is also possible that the welding element has a three-dimensional configuration and in this context preferably has the shape of a curved plate or the shape of a curved platelet. The curve of the platelet is expediently adapted to the shape or to the curvature of a tube receptacle of the fastening clip.

Another exemplary embodiment of the disclosure is characterized in that the fastening clip has a window-like or window-shaped clip receptacle which passes through the wall of the fastening clip or connects the two opposite sides, in particular the inside and the outside, of the fastening clip. Inside, by the way, means the side of the fastening clip which is facing the tube, and outside means the side of the fastening clip which faces away from the tube. It is within the scope of the disclosure that the welding element in the window-like clip receptacle can in particular be positively and/or non-positively fastened or is fastened. According to one embodiment of the disclosure, the window-like clip receptacle has a rectangular cross section or a substantially rectangular cross section. In principle, however, other cross-sectional configurations of the window-like clip receptacle are also conceivable. After fastening the welding element in the window-like clip receptacle, the welding element or part of the welding element which is arranged in the region of the window openings preferably on both opposite sides or at the inside and at the outside is designed coverless and—before welding to the tube—freely accessible from both sides. Expediently, at least the part of the welding element which is accessible from the outside comprises at least partially plastic which is weldable with the outer surface of the tube. It is recommended that in this embodiment, the welding element is fastened with at least one edge region to at least one edge of the window-like clip receptacle at the fastening clip. According to a preferred embodiment of the disclosure, the welding element is fastened with at least two opposite edge regions or over its entire edge at the edge of the window-like clip receptacle. This is preferably a positive and/or non-positive fastening.

It is within the scope of the disclosure that the fastening clip has at least one tube receptacle in which the tube is positively received. Furthermore, it is within the scope of the disclosure that the welding element—in particular the clip receptacle or window-like clip receptacle with the welding element—is arranged at the tube receptacle of the fastening clip. It is recommended that the welding element or the weldable plastic of the welding element at the inside of the tube receptacle is weldable or is welded with the outer surface of the tube.

According to one embodiment of the disclosure, the tube receptacle has a U-shaped cross-section with two opposite U-legs and a U-base connecting the U-legs. A highly recommended embodiment of the disclosure is characterized in that the welding element, in particular the clip receptacle or the window-like clip receptacle with the welding element, is arranged at the U-base of the U-shaped tube receptacle and particularly preferably substantially at the U-base or only at the U-base. Expediently, the welding element, in particular the clip receptacle or window-like clip receptacle with the welding element, is provided centrally or substantially centrally at the U-base of the tube receptacle. According to a recommended embodiment variant, the window-like clip receptacle or the welding element fastened in the window-like clip receptacle is delimited by two opposite base sections extending in the longitudinal direction of the U-base. These base sections thus form as it were two opposite edges of the window-like clip receptacle.

It is within the scope of the disclosure that the tube in the assembled or welded state covers a fastening surface of the tube receptacle of the fastening clip. In a preferred U-shaped tube receptacle of the fastening clip, the tube covers at least partially the inside of the U-shaped legs and the U-shaped base of the tube receptacle. For welding to the outer surface of the tube, the welding element according to the disclosure is recommended to have an open or cover-free surface facing the tube. This tube-facing open or cover-free surface of the welding element is suitably not more than 40%, preferably not more than 35% and preferably not more than 30% of the fastening surface, which covers the entire tube in the tube receptacle.

A recommended embodiment of the disclosure is characterized in that the weldable plastic of the welding element corresponds to or substantially corresponds to the plastic of the outer surface of the tube. If the outer surface or the outer layer of the tube is an outer surface or outer layer based on a polyamide, the welding element or the weldable plastic of the welding element expediently consists of a polyamide or substantially of a polyamide and/or of a polymer which is weldable with a polyamide. If the material of the outer surface or of the outer layer of the tube is a material based on a polyolefin, in particular based on polyethylene, preferably also the welding element or the weldable plastic of the welding element consists of a polyolefin, in particular of polyethylene or substantially of polyolefin or polyethylene.

One embodiment of the disclosure is characterized in that the tube which can be fastened to the fastening clip is a multi-layer tube. The welding element or the weldable plastic of the welding element is then weldable with the outer layer of the multi-layer tube. The tube of the fastening unit according to the disclosure preferably has two to six layers, preferably two to five layers.

Another embodiment of the disclosure is characterized in that the welding element or the weldable plastic of the welding element is welded or weldable to the outer surface of the tube by laser welding. The welding element or the weldable plastic of the welding element is expediently laser-welded to the outer surface or to the outer layer of the tube. The laser welding has proven particularly useful in terms of solving the technical problem of the disclosure. In this context, it is within the scope of the disclosure that at least the weldable region or the weldable plastic of the welding element consists of laser-transparent plastic or substantially consists of laser-transparent plastic. The entire welding element preferably consists of laser-transparent plastic or substantially of laser-transparent plastic. An embodiment of the disclosure is characterized in that the welding element at the first side facing the tube consists of or substantially consists of a first weldable plastic—in particular of a laser-absorbent plastic—and consists of or substantially consists of at least one second plastic at the side facing away from the tube, in particular of at least one laser-transparent second plastic. As already stated above, an embodiment of the disclosure is characterized in that the welding element—in particular with respect to the radial direction of the tube—has a multi-layer configuration such as for example a two-layer configuration. In this case, an embodiment variant is characterized in that at least one layer of the welding element or a layer of the welding element facing the tube or which can be brought in contact with the tube consists of or substantially consists of weldable laser-absorbent plastic and at least one, preferably a further layer of the welding element consists of or substantially consists of laser-transparent plastic.

Laser welding is particularly preferred within the scope of the disclosure. Particular importance is attached to the preferred laser welding of the embodiment variant explained above with the window-like clip receptacle. Expediently, the welding element is received in such a window-like clip receptacle, which passes through the wall of the fastening clip. Preferably, in the region of the two opposite window openings of this window-like clip receptacle, the weldable plastic of the welding element is arranged and this weldable plastic can be brought in contact with the outer surface of the tube on its one side. On its side facing away from the tube the welding element is expediently accessible for a welding apparatus, in particular for a laser welding apparatus. In this embodiment variant, a particularly effective and simple laser welding can be performed. It has already been pointed out that the welding element is preferably positively and/or non-positively fastened in the window-like clip receptacle of the fastening clip.

A recommended embodiment of the disclosure is characterized in that the welding element is already positively and/or non-positively fastened to the fastening clip and that in this state, the welding element or the aggregate of fastening clips and welding element is connected by welding to the tube. A further embodiment of the disclosure is characterized in that initially only the welding element or the weldable plastic of the welding element is welded to the tube and that the fastening clip can be fastened to the already welded welding element, in particular that it can be pushed on and/or latched on. A recommended embodiment variant is additionally characterized in that the fastening clip can be removed from the welded-on welding element, for example, it can be pushed off the welding element.

To solve the technical problem according to the disclosure, the disclosure further teaches a method for fastening a motor vehicle tube to at least one fastening clip, wherein the motor vehicle tube has an outer surface or an outer layer of plastic, which is welded to the fastening clip, wherein a fastening clip is used which comprises at least one welding element which at least partially consists of or substantially consists of a plastic which is weldable with the outer surface or to the outer layer of the tube, wherein the welding element is positively and/or non-positively fastened to the fastening clip, is welded to the outer surface of the tube or welded with the outer surface of the tube. This welding of the welding element to or with the outer surface/outer layer of the tube is preferably carried out by means of laser welding.

According to a preferred embodiment of the method according to the disclosure, the welding element is firstly positively and/or non-positively fastened to the fastening clip and subsequently the tube is welded to the fastening clip or to the welding element of the fastening clip, preferably by laser welding. It is recommended to specifically select the welding element with respect to the outer surface or outer layer of the tube, wherein the welding element comprises a weldable plastic, which is weldable with the outer surface or with the outer layer of the tube.

An alternative embodiment of the disclosure is characterized in that firstly the welding element is welded to the outer surface or to the outer layer of the tube—preferably by laser welding—and that the (remaining) fastening clip is subsequently positively and/or non-positively fastened to the welding element it is welded onto. The welding element is in turn specifically selected, so that a weldable plastic of the welding element is weldable with the outer surface or with the outer layer of the tube.

In both embodiments described above, only the welding element or the weldable plastic of the welding element is expediently selected in accordance with the material of the outer surface or outer layer of the tube. The rest of the fastening clip can be selected with regard to its material, regardless of the nature of the tube or the nature of the outer surface of the tube and may for example consist of standard plastic. It is within the scope of the disclosure that the welding element or the weldable plastic of the welding element consists of or substantially consists of a laser-transparent plastic and that the rest of the fastening clip, however, consists of or at least substantially consists of a non-laser-transparent material.

The disclosure is based on the finding that a very variable and flexible fastening option for tubes or motor vehicle tubes to fastening clips is created with the tube fastening unit according to the disclosure and with the method according to the disclosure. The fastening clips used can be selected independently of the material of the tubes and only the welding element must be accordingly configured. The fastening clips can be easily formed in such a manner that the welding elements selected according to the material of the tube can be positively and/or non-positively fastened to the fastening clip in a simple manner. Furthermore, the fastening clip with its welding element can be welded with the tube in a very simple and safe way, in particular by laser welding. The fastening clips according to the disclosure with their respective selected welding elements can be produced in a simple and inexpensive manner and their main advantage over the measures known from prior art consists in the fact that less effort in terms of production and storage is required. The same fastening clips (without welding element) can be used for a variety of different tubes with different outer surfaces. Only the welding elements must be matched with respect to their material to the material of the outer surface of the tube. What ensues from the fact that the welding elements are usually much smaller than the rest of the fastening clip is a significantly reduced cost of materials compared to the known measures. This is especially true when the fastening clip is to be connected to the tube by laser welding and a relatively expensive laser-transparent plastic material is required to achieve the latter. In this case only the relatively small welding element must consist of laser-transparent plastic, while the rest of the fastening clip may be made of a different material or of a different plastic. As a result, the disclosure is characterized by simplicity, low investment of work and low cost. In addition, the disclosure is based on the finding that with the attachment unit according to the disclosure, unwanted movements or displacements of the tubes can be effectively and reliably prevented, in particular unwanted axial and radial movements and rotational movements and this in fact by a combination of positive engagement and/or adhesion between fastening clip and welding element on the one hand and a material connection between the fastening clip and the tube on the other hand.

Further areas of applicability will become apparent from the description provided herein. Everyone should understand that the description and specific examples presented herein are for the purpose of illustration only and are not intended to limit the scope of the present disclosure.

BRIEF DESCRIPTION OF THE DRAWINGS

The disclosure will be explained in more detail with reference to a drawing showing only one exemplary embodiment. In a schematic representation.

Figure 1:
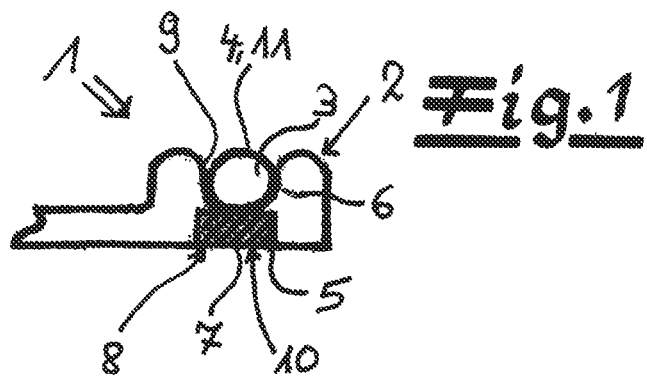
FIG. 1 is a section through a tube fastening unit according to the disclosure.
Figure 2:
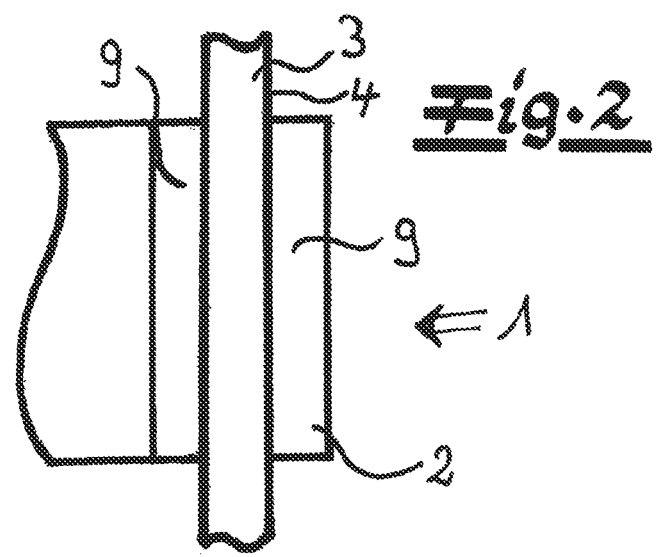
FIG. 2 is a plan view of the object according to FIG. 1.
Figure 3:
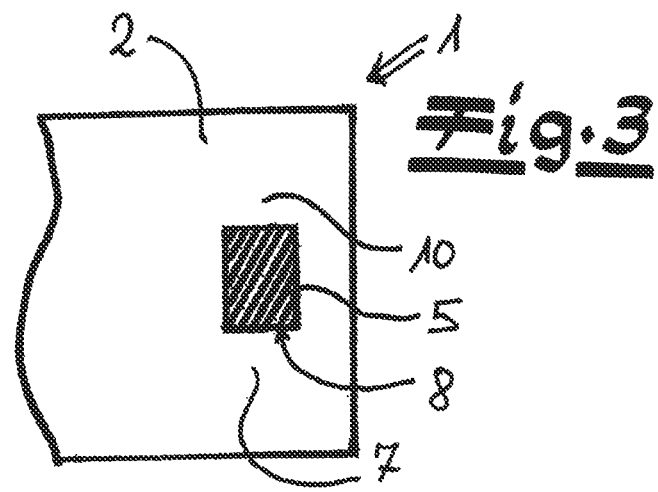
FIG. 3 is a bottom view of the object according to FIG. 1.

The drawings described herein are for illustration purposes only and are not intended to limit the scope of the present disclosure in any way.

DETAILED DESCRIPTION

The figures show a tube fastening unit 1 from a fastening clip 2 and a motor vehicle tube 3 fastened to the fastening clip 2 according to the disclosure. It is within the scope of the disclosure that the motor vehicle tube 3 is fastened to a plurality of fastening clips 2 of the type shown, wherein the fastening clips are in particular fastened in a motor vehicle. According to the disclosure, the motor vehicle tube 3 has an outer surface 4 made of plastic, which is weldable with or welded to the fastening clip 2. In the exemplary embodiment according to the figures, it can be seen that the fastening clip 2 is equipped with a welding element 5, which preferably and in the exemplary embodiment completely consists of a weldable plastic which is welded with the outer surface 4 of the tube 2. Expediently and in the exemplary embodiment, the tube 3 is a multi-layer tube 3, and the welding element 5 is welded with the outer layer 11 of the multi-layer tube 3. In the exemplary embodiment, the remaining fastening clip 2 consists of a plastic that is different from the weldable plastic of the welding element 5.

Expediently, and in the exemplary embodiment, the welding element 5 is positively and non-positively fastened to the fastening clip 2. Preferably, and in the exemplary embodiment, the fastening clip 2 is provided for fastening the welding element 5 with a window-like clip receptacle 8, which passes through the wall of the fastening clip 2 or interconnects the two opposite sides, namely the inside 6 and the outside 7 of the fastening clip 2. The welding element 5 is preferably and in the exemplary embodiment positively and non-positively received in the window-like clip receptacle 8. As a result, the welding element 5 is arranged at the first side or inside 6 of the fastening clip 2 facing the tube 3 without cover or without the interposition of further components. Furthermore, the welding element 5 is preferred and arranged in the exemplary embodiment also at the second side or outside 7 of the fastening clip 2 opposite the first side or the inside 6 without cover or without the interposition of other components. Due to this arrangement, the welding element 5 can be easily brought into contact with the outer surface 4 or the outer layer 11 of the tube 3 for welding, and also the welding element 5 is easily accessible from the outside 7 for welding.

Expediently, and in the exemplary embodiment, edge regions of the welding element 5 are positively and non-positively fastened at the edges of the window-like clip receptacle 8. Preferably, and in the exemplary embodiment, the weldable plastic of the welding element 5 may correspond to the plastic of the outer surface 4 or the plastic of the outer layer 11 of the tube 3, so that a welding of the welding element 5 with the outer layer 11 of the tube 3 is easily possible. It is recommended, and is the case in the exemplary embodiment, that the welding of the welding element 5 with the outer layer 11 of the tube 3 is carried out by means of laser welding. For this purpose, preferably and in the exemplary embodiment, the welding element 5 consists of a laser-transparent plastic and due to the arrangement in the window-like clip receptacle 8, the welding element 5 is easily accessible for laser welding from the outside 7.

The design of the attachment unit 1 according to the disclosure makes it possible that only the relatively small welding element 5 must be selected with respect to the material of the tube 3 and that the fastening clip 2 may otherwise consist of any material or plastic material. Thus, a complex production and storage of a variety of different fastening clips 2 can be omitted and only different relatively small welding elements 5 must be kept in stock.

Preferably and in the exemplary embodiment, the fastening clip 2 moreover has a U-shaped tube receptacle 9, in which the tube 3 is positively received. The welding element 5 or the window-like clip receptacle 8 with the welding element 5 is preferably and in the exemplary embodiment centrally arranged at the U-base 10 of the U-shaped tube receptacle 9. This placement of the welding element 5 has proven particularly useful for a functionally reliable fastening in the disclosure.

The invention claimed is:

1. Tube fastening assembly comprising at least one fastening clip and at least one motor vehicle tube configured to be fastened to the fastening clip, the motor vehicle tube having an outer surface made of plastic which is weldable to the fastening clip, wherein the fastening clip has at least one welding element, which consists at least regionally of a weldable plastic, and which is weldable with the outer surface of the tube, and wherein the welding element can be at least one of positively fastened and non-positively fastened to a mounting clip, wherein the fastening clip has a window-shaped clip receptacle which extends through a wall of the fastening clip and connects two opposite sides, namely an inside and an outside, of the fastening clip to one another, and wherein the welding element is positioned in the window-shaped clip receptacle and is at least one of positively fastened and non-positively fastened.

2. Fastening assembly according to claim 1, wherein the fastening clip substantially consists of a material or plastic different from the weldable plastic of the welding element.

3. Fastening assembly according to claim 1, wherein at least one region of the welding element or the weldable plastic of the welding element is arranged at a first side of the fastening clip facing the tube without a cover or the interposition of further components.

4. Fastening assembly according to claim 3, wherein at least one part of the welding element or the weldable plastic of the welding element is arranged at the first side of the fastening clip facing the tube as well as at a second side opposite the first side of the fastening clip, without cover or the interposition of other components.

5. Fastening assembly according to claim 1, wherein the welding element is only positively fastened in a clip receptacle of the fastening clip.

6. Fastening assembly according to claim 1, wherein the welding element is fastened to the fastening clip in a clip receptacle of the fastening clip by a latching connection.

7. Fastening assembly according to claim 1, wherein the fastening clip has at least one tube receptacle in which the tube is positively receivable, and wherein the clip receptacle with the welding element is arranged at the tube receptacle and at a base of a U-shaped tube receptacle.

8. Fastening assembly according to claim 7, wherein the tube in the mounted or welded state covers a fastening surface of the tube receptacle and the surface of the welding element which is open and cover-free facing towards the tube amounts to at most 40% of the fastening surface.

9. Fastening assembly according to claim 1, wherein the weldable plastic of the welding element substantially corresponds to the plastic of the outer surface of the tube.

10. Fastening assembly according to claim 1, wherein the tube is a multi-layer tube and the welding element is weldable to the outer layer of the multi-layer tube.

11. Fastening assembly according to claim 1, wherein the welding element is weldable to the outer surface or to the outer layer of the tube by means of laser welding.

12. Fastening assembly according to claim 1, wherein at least the weldable region or the weldable plastic of the welding element substantially consists of laser-transparent plastic.

13. Fastening assembly according to claim 1, wherein the welding element is multi-layered and a layer of the welding element facing the tube substantially consists of the weldable plastic.

14. Fastening assembly according to claim 1, wherein the welding element is welded to the tube and the fastening clip can be fastened to the welded-on welding element, and pushed or latched to the welded-on welding element and is removable from the welding element.

15. Method for fastening a motor vehicle tube to at least one fastening clip, wherein the motor vehicle tube has an outer surface or an outer layer made of plastic, which is welded to the fastening clip, wherein a fastening clip is used, which has at least one welding element, which consists at least partially of a plastic which is weldable to the outer surface or to the outer layer of the tube, comprising the step of fastening the welding element, positively or non-positively, to the fastening clip, by welding to the outer surface or to the outer layer of the tube, wherein the fastening clip has a window-shaped clip receptacle which extends through a wall of the fastening clip and connects two opposite sides, namely an inside and an outside, of the fastening clip to one another, and wherein the welding element is positioned in the window-shaped clip receptacle and is at least one of positively fastened and non-positively fastened.

16. Method according to claim 15, wherein initially the welding element is at least one of positively fastened and non-positively fastened to a mounting clip and that subsequently the tube is welded to the welding element of the fastening clip by laser welding.

17. Method according to claim 15, wherein initially the welding element at the outer surface or at the outer layer of the tube is welded on by laser welding, and subsequently the remaining fastening clip is at least one of positively fastened and non-positively fastened to the welded-on welding element.

18. Tube fastening assembly comprising at least one fastening clip and at least one motor vehicle tube configured to be fastened to the fastening clip, the motor vehicle tube having an outer surface made of plastic which is weldable to the fastening clip, wherein the fastening clip has at least one welding element, which consists at least regionally of a weldable plastic, and which is weldable with the outer surface of the tube, and wherein the welding element can be at least one of positively fastened, non-positively fastened, and materially fastened to a mounting clip, and wherein the welding element is fastened to the fastening clip in a clip receptacle of the fastening clip by a latching connection.

* * * * *